Jan. 15, 1935.   C. H. FOX   1,987,929
PRESSURE GAUGE ATTACHMENT
Filed Oct. 15, 1930   2 Sheets-Sheet 1

INVENTOR
CHARLES H. FOX.
BY
Toulmin & Toulmin
ATTORNEY

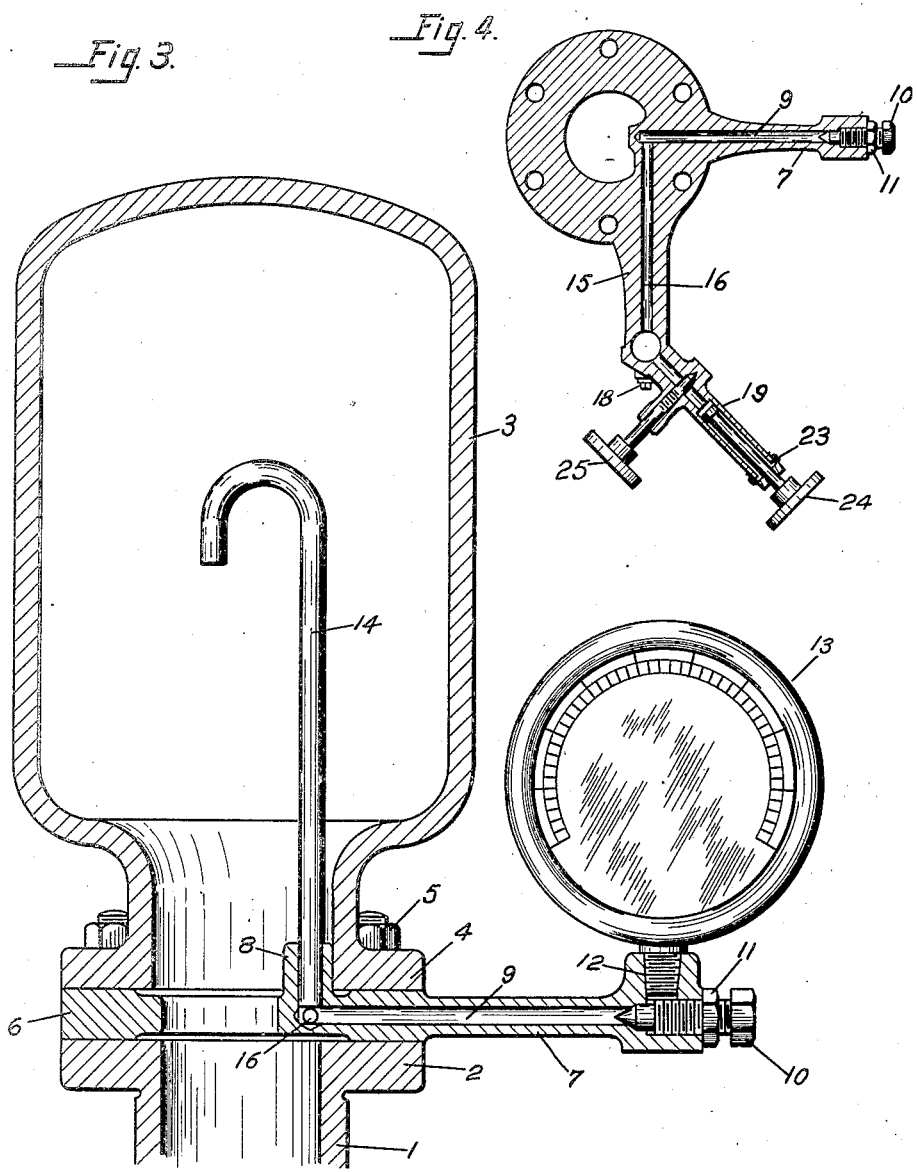

Patented Jan. 15, 1935

1,987,929

UNITED STATES PATENT OFFICE 1,987,929

PRESSURE GAUGE ATTACHMENT

Charles H. Fox, Cincinnati, Ohio, assignor to The Ahrens-Fox Fire Engine Company, Cincinnati, Ohio, a corporation of Ohio Application October 15, 1930, Serial No. 488,984

9 Claims. (Cl. 73—31)

This invention relates to apparatus for preventing the freezing of water pressure gauges, and has for its object the provision of means to prevent water gauges used in connection with fire engine pumps freezing.

While this apparatus is particularly adapted for use in connection with the rotary type of fire pump, it may be used with other types of pumps.

It is particularly the object of this invention to provide, in connection with the water pipe, a detachable gauge for indicating the pressure of the water in the pipe and means for preventing the gauge from freezing.

It is particularly the object of this invention to provide, in connection with a water pipe and an air pressure chamber, means for indicating the pressure of the water and adapted to contain an anti-freezing liquid so that the indicator will operate at all conditions of temperature without freezing, and in order to accomplish this purpose there is provided, in connection with the pressure gauge, means for supplying thereto an anti-freezing fluid or liquid and connecting the fluid therein to the air chamber so that the condition of the fluid in the air chamber is responsive to the pressure of the air in the air chamber.

It is also an object of this invention to provide, in connection with an anti-freezing pressure gauge, an oil pump in connection therewith for the purpose of coating the interior surface of the water pump with an oil contained in the water pressure gauge.

These and other advantages will appear from the description taken in connection with the drawings.

Referring to the drawings:

Figure 3 is a vertical section through the air chamber and the passageway leading from the air chamber to the pressure gauge, showing how the pressure gauge is supported in connection with the air chamber.

Figure 4 is a section on the line 4—4 of Figure 2 looking in the direction of the arrows.

Figure 1:
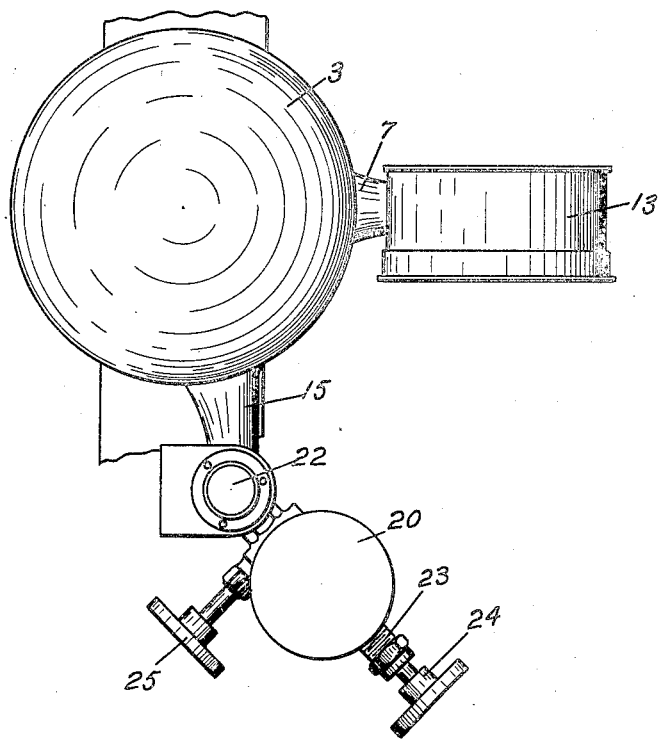
Figure 1 is a top plan view of the assembled apparatus.

While this apparatus is particularly adapted for use in connection with fire engines, it may be used in connection with and for the determination of water pressure in connection with various apparatus. The apparatus is easily detached and may be attached to different structures.

In the present instance it is shown in connection with a water pipe 1, having the usual end flange 2 by which it is attached to an air chamber 3 which has a flange 4 by which it is attached to the flange of the water pipe by means of bolts 5 extending through the flanges. In the present instance instead of the two flanges 2 and 4 being directly attached to each other there is intervening between these two flanges, and separating the pipe from the tank, an annular disc 6 which has an opening therein in line with the opening of the pipe and the opening into the air chamber.

Extending from one side of the annular disc is an arm 7, which has extending therethrough a passageway 9. This passageway intersects two other passageways, one extending vertically through a boss 8 on the annular disc extending into the opening therein. This boss, when the parts are assembled as shown in Figure 3, extends upwardly within the mouth part of the air chamber and supports a pipe, later to be described.

In the outer end of the arm 7 is a valve member 10 held in position by means of a lock nut 11. This valve is used to regulate the opening in the outer end of the arm 7 so that the passage of a non-freezing fluid through the passageway 9 may be controlled. In the outer end of the arm 7 there is a hole 12, in which a pressure gauge 13 is screwed. This pressure gauge is of the usual type and is operated by pressure passing in the form of a fluid or gas through the passageway 9 up into the pressure gauge member. The flow or passage of the fluid through the passageway 9 into the pressure gauge member is controlled by the valve 10.

Extending upwardly from the inner end of the passageway 9 and located in the vertical orifice or hole in the boss 8 is a pipe 14. The upper end of this pipe is bent down as shown in Figure 3. This pipe serves at least two purposes. One is to form a means for the passage of a lubricant to the walls of the pipe and the walls of the air chamber and to the water pump. It also serves to retain the anti-freezing liquid in the pressure gauge member so that there is always present in this member the anti-freezing liquid, such as oil.

There is also extending from the annular disc 6 a second arm 15, which has a passageway 16 therethrough leading from the opening or cavity in the boss 8 to the hub end 17 of the arm. In the end of the arm is an opening closed by a stop plug 18. This opening leads into the passageway 16. The passageway 16 merges into a vertical passageway which extends upwardly in the hub 17 and into the body member 19 of the anti-freezing liquid carrying part of the apparatus.

Extending upwardly from the body member and in line with the passageway in the hub 17 is a pipe 21, which has on the upper end thereof a light 22. Extending at a right angle to the vertical passageway in the hub 17 is another passageway for the admission of a non-freezing liquid into the air chamber. In the end of this passageway remote from the hub 17 is a pump plug 23 in which works the pump 24 for pumping the liquid into the passageways and into the pipe 14, and also into the pressure gauge. The liquid pumped is stored in an oil reservoir 20, located on top of the body member, which has an opening into the pump passageway for the discharge of the liquid through the passageway 16 into the passageway 9 and into the pressure gauge and also into pipe 14. In order to regulate the passage of the liquid from the reservoir into and through the passageway 16 there is provided a cut-off valve 25.

This apparatus is composed essentially of three parts, first, a supporting part comprising an annular disc with two arms extending therefrom, and each having a passageway therethrough. Second, on the outer end of one of these arms and communicating with the passageway therein is a pressure gauge removably mounted thereon. Third, on the outer end of the other arm is a fluid containing and fluid pumping apparatus for forcing fluid from the reservoir into the pressure gauge member and into the pipe 14. The parts are shown assembled in Figure 2.

Figure 2:
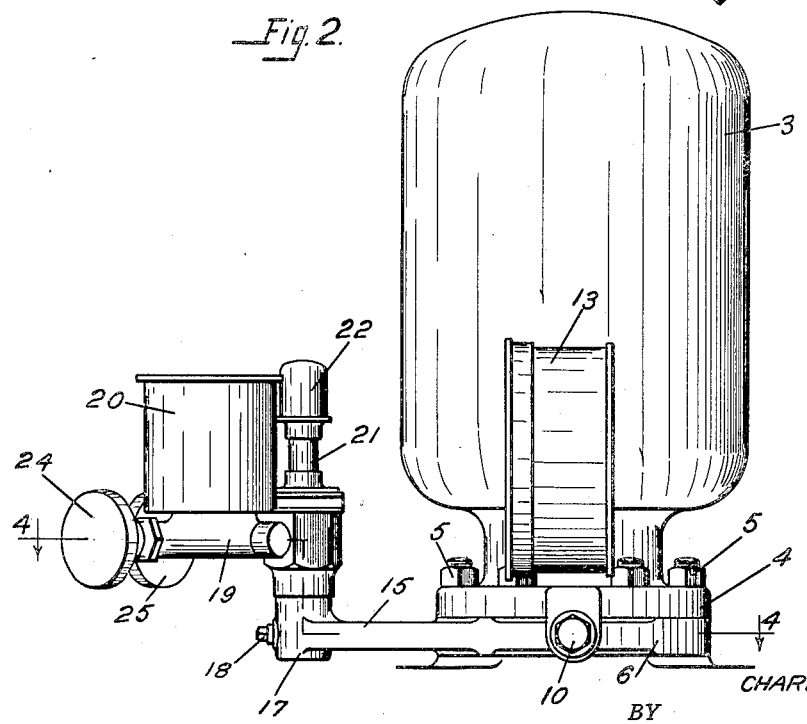
Figure 2 is a side elevation thereof.

As shown in this Figure 2, the pressure of the water in the pipe 1 causes a compression of the air in the air chamber 3. This increased pressure in the air chamber causes an increased pressure on the fluid or liquid in the pipe 14, and causes a resulting action in the gauge member 13. Any increase or decrease of pressure in the air chamber will be registered in the gauge member by means of the liquid in the different passageways, and the pipe 14.

By the use of this apparatus, filled with some non-freezing liquid, the gauge works at all seasons of the year regardless of low temperature. By means of the liquid reservoir and pump a new supply of liquid may be forced into the passageways and pipe 14, and into the pressure gauge. This liquid may also be used for lubricating purposes, and for this purpose the liquid will pass out at the down-turned end of the pipe 14.

This apparatus may be removed from the assemblage, as shown in Figure 3, by merely removing the nuts from the bolts so that the disc may be taken out, and either a new one may be placed therein or the parts assembled without the intervening disc member 6. This apparatus can be assembled in any connection, such as that shown in Figure 3.

I desire to comprehend within my invention such modifications as may be embraced within my claims and the scope of my invention.

Having thus fully described my invention, what I claim is new and desire to secure by Letters Patent, is:

1. In an anti-freeze pressure gauge, in combination with a water pipe and an air chamber, a gauge member, an arm for supporting the gauge member having thereon an annular extension adapted to fit between said pipe and said chamber, said extension having a passageway leading from the gauge member, and a pipe extending from said passageway into said air chamber for conducting pressure into said gauge member.

2. In an anti-freeze pressure gauge, in combination with a water pipe and an air chamber, an annular disc adapted to fit between said pipe and the chamber, said disc having a boss with a cavity therein, an arm on said disc, a gauge member on said arm, said arm having a passageway leading from the gauge member to said cavity, and a pipe fitting in said cavity and extending into said chamber whereby pressure is conveyed to the gauge member.

3. In an anti-freeze gauge, in combination with a water pipe and an air chamber, a disc member having a central opening therein and a boss in said opening, said disc member being adapted to fit between the pipe and the chamber, said boss having a cavity therein, a gauge member on said disc member having a passageway to said cavity, means for forcibly supplying a non-freezing fluid to said cavity, and a pipe extending from said cavity into said chamber.

4. In an anti-freeze pressure gauge, in combination with a water pipe and an air chamber, an annular body member having an opening therein forming a connection between the pipe and the chamber, a gauge member on said body member having a passageway leading into said opening, a fluid reservoir on said body having a passageway leading into said opening, said passageways having a common exit into said opening, a pipe leading from said exit into the chamber, and means connected to said reservoir to force the fluid from said reservoir into said gauge member and said last-named pipe.

5. In a gauge, a body member having a pair of arms thereon, each arm having a passageway that terminates in the end of the other passageway in the body, a gauge member supported on one of said arms and having communication with the passageway therein, and a fluid reservoir supported on the other arm and having communication with the passageway therein.

6. In a gauge, a body member having a pair of arms thereon, each arm having a passageway that intersects the passageway in the other arm, a gauge member supported on one of said arms and having communication with the passageway therein, a fluid reservoir supported on the other arm and having communication with the passageway therein, and means to force the fluid from the reservoir through the passageways into the gauge member.

7. In a gauge, a body member having a pair of arms thereon, each arm having a passageway that intersects the passageway in the other arm, a gauge member supported on one of said arms and having communication with the passageway therein, a fluid reservoir supported on the other arm and having communication with the passageway therein, means to force the fluid from the reservoir through the passageways into the gauge member, and a pipe extending up from the intersection of the two passageways.

8. In combination with a water pipe, of an air chamber in communication with the pipe, a pressure gauge, means providing communication between the pressure gauge and the air chamber, and pump means to supply oil to said communication means between the gauge and the air chamber and the pipe whereby oil is always interposed between the gauge and the air chamber and the pipe and oil is discharged into the air chamber.

9. In combination with a water pipe, of an air chamber, a pressure gauge, a passageway connecting said pressure gauge to the air chamber, a pipe with an inverted end extending into the air chamber from the pressure gauge to serve as a passageway for lubricant and as an antifreezing liquid retainer, an oil reservoir connected thereto and to the gauge, a valve for controlling said reservoir, a pump for actuating fluid from said reservoir to the gauge and to the air chamber, and means for controlling the amount of oil so delivered to the gauge.

CHARLES H. FOX.